United States Patent [19]

Ward

[11] Patent Number: 5,121,021

[45] Date of Patent: Jun. 9, 1992

[54] FRAME AND MAGNET ASSEMBLY FOR A DYNAMOELECTRIC MACHINE

[75] Inventor: Robert W. Ward, Anderson, Ind.

[73] Assignee: General Motors Corporation, Detroit, Mich.

[21] Appl. No.: 447,541

[22] Filed: Dec. 6, 1989

[51] Int. Cl.$^5$ .................................. H02K 21/26
[52] U.S. Cl. ............................. 310/154; 310/43; 310/44; 310/91; 310/258
[58] Field of Search ............... 310/154, 152, 44, 218, 310/258.89, 91, 177, 185, 43, 187, 42; 148/103, 104; 428/611; 335/303

[56] References Cited

U.S. PATENT DOCUMENTS

| | | | |
|---|---|---|---|
| 3,500,090 | 3/1970 | Baermann | 310/154 |
| 3,567,979 | 3/1971 | Jaffe | 310/187 |
| 3,594,599 | 7/1971 | West | 310/258 |
| 3,988,623 | 10/1976 | Yamaguchi | 310/154 |
| 4,071,788 | 1/1978 | Martin et al. | 310/42 |
| 4,155,021 | 5/1979 | Corbach | 310/218 |
| 4,250,423 | 2/1981 | Linscott, Jr. | 310/258 |
| 4,296,343 | 10/1981 | McMillen | 310/154 |
| 4,769,624 | 9/1988 | Merritt et al. | 310/154 |

FOREIGN PATENT DOCUMENTS

| | | | |
|---|---|---|---|
| 1071214 | 12/1959 | Fed. Rep. of Germany | 310/44 |
| 3741919 | 6/1988 | Fed. Rep. of Germany | . |
| 1017121 | 12/1952 | France | 310/44 |
| 0020295 | 2/1977 | Japan | 335/303 |
| 0158013 | 2/1921 | United Kingdom | 310/44 |

OTHER PUBLICATIONS

Powder Metallurgy; vol. 25; No. 4; "Properties & Applications of Soft Magnetic Composites", Kordecki et al; pp. 201–208; (no month) 1982.

*Primary Examiner*—R. Skudy
*Attorney, Agent, or Firm*—C. R. Meland

[57] ABSTRACT

A frame and permanent magnet assembly for a dynamoelectric machine where the frame carries a plurality of permanent magnets. The frame is formed of iron powder particles that are bound together by a thermoplastic material. In the manufacture of the assembly, iron powder particles that are coated with a thermoplastic material are molded to the permanent magnets. The permanent magnets have surfaces that are interlocked to the material of the frame thereby eliminating the need for mechanical fasteners or an adhesive to secure the permanent magnets to a frame.

10 Claims, 2 Drawing Sheets

FRAME AND MAGNET ASSEMBLY FOR A DYNAMOELECTRIC MACHINE

This invention relates to a frame and magnet assembly for dynamoelectric machines.

Dynamoelectric machines that have a frame that is formed of magnetic material, such as steel, that carries permanent magnets are well known. The magnets can be secured to the frame by mechanical fastening means or can be held to the frame by any adhesive. An example of mechanical fastening is disclosed in the U.S. Pat. No. Merritt et al., 4,769,624.

In contrast to the just described methods of securing a permanent magnet to a frame, it is the object of this invention to provide a frame and magnet assembly where the frame is formed of a molded composite magnetic material of iron powder and plastic material and wherein the frame and magnet have an interface that is shaped to provide means for retaining the magnet secured to the frame without the use of any additional securing means such as mechanical fasteners or an adhesive.

The composite magnetic frame material is comprised of iron powder particles having a particle size in a range of about 10 to 250 microns that are coated with a thin layer of thermoplastic material. The composite material is molded to the permanent magnet. It, accordingly, is another object of this invention to provide a method of manufacturing a frame and permanent magnet assembly where a composite material of the type described is molded to the permanent magnet.

Another object of this invention is to provide a frame and magnet assembly where outer edge surfaces of the magnet engage the material of the frame and where the interface between the frame material and the surface of the magnet are shaped to secure the magnet to the frame material. More specifically, opposite side surfaces of the permanent magnet are arranged such that engagement between these surfaces and portions of the frame material prevents the magnet from moving radially away from the frame and prevents the magnet from moving circumferentially relative to the frame. Further, opposite end surfaces of the magnet engage frame material to prevent movement of the magnet axially of the frame. Accordingly, the magnet is securely interlocked to the frame material without the use of mechanical fastening means or an adhesive.

IN THE DRAWINGS

Figure 1:
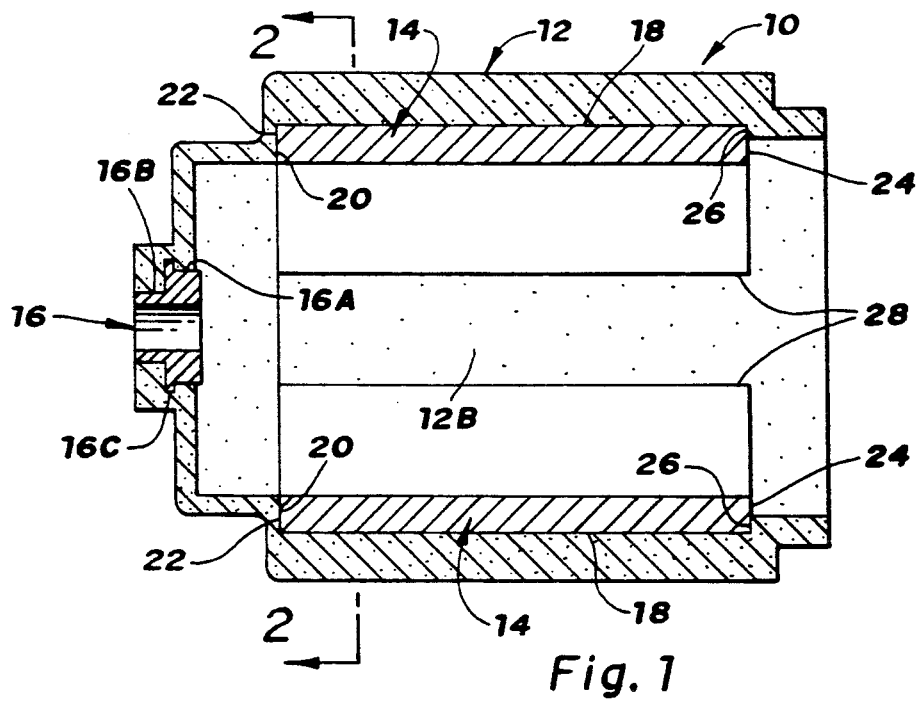
FIG. 1 is a sectional view of a frame and magnet assembly made in accordance with this invention.
Figure 2:
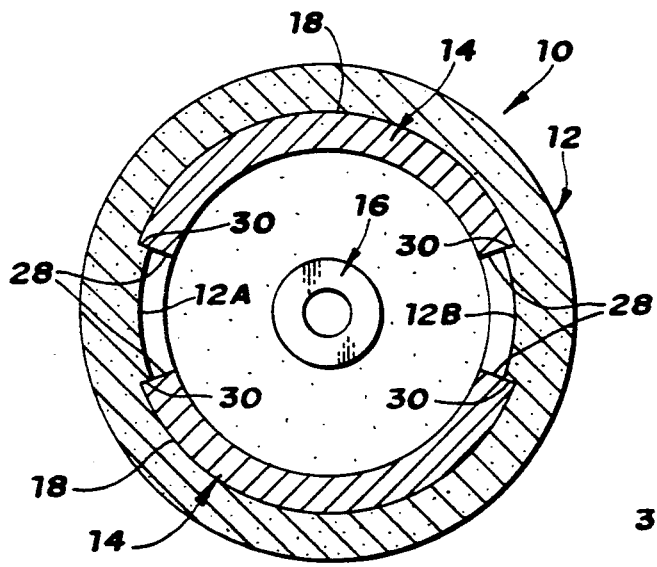
FIG. 2 is a sectional view taken along line 2—2 of FIG. 1.

Referring now to the drawings and more particularly to FIGS. 1 and 2, a frame and permanent magnet assembly 10 for a dynamoelectric machine is illustrated. The assembly 10 is the field assembly for a direct current dynamoelectric machine of the type that has a wound armature or rotor. The dynamoelectric machine may, for example, be a direct current motor and may be an electric cranking motor for an electric engine starter.

The assembly 10 comprises a frame 12 that carries two permanent magnets each designated as 14. Frame 12 also carries a metallic bushing type bearing 16. As will be described more specifically hereinafter, frame 12 is formed of a composite material comprised of iron powder particles that are coated with a thermoplastic material and frame 12 is formed by molding the composite material to the permanent magnets and bearing.

Permanent magnets 14 have an arcuate shape and have an outer surface 18 that engages frame 12. The frame 12 has an annular surface 20 that respectively engages arcuately extending end faces or surfaces 22 of magnets 14. The opposite end faces or surfaces 24 of magnets 14 respectively engage arcuately extending surfaces 26 of frame 12. The engaged surfaces 20 and 22 and 24 and 26 prevent the permanent magnets 14 from moving axially with respect to frame 12. Putting it another way, the permanent magnets 14 and frame 12 are interlocked by the engaged surfaces with respect to relative axial movement.

The permanent magnets 14 are also interlocked to frame 12 to prevent the magnets from moving radially inwardly relative to frame 12 or circumferentially relative to frame 12. To accomplish this, the magnets 14 have radially extending end faces or surfaces 28 that each lie along a radius from the center of bushing type bearing 16. The surfaces 28 engage surfaces 30 on frame 12 and this prevents the magnets 14 from moving circumferentially relative to frame 12. Further, the engagement of surfaces 28 and 30 prevent the magnets 14 from moving relative to frame 12 in a direction radially away from frame 12. Thus, the engaged surfaces 28 and 30 provide a dove-tail type of connection between the magnets and the frame which prevents the magnets from moving away from the frame. The engaged surfaces of the magnets 14 and the frame material therefore form an interlock between the frame and magnets which prevents any movement of the magnets relative to the frame.

From what has been described, it can be appreciated that the permanent magnets 14 are interlocked to the material of frame 12.

Outer surfaces of bushing type bearing 16 engage the material of frame 12 to secure the bushing to an end wall portion of frame 12. These surfaces include circular surfaces 16A and 16B. The bushing type bearing 16 has a circular flange portion 16C which engages the material of frame 12 to fix the bushing 16 from axial movement relative to the frame 12. The bushing 16 is interlocked to the frame and it operates as a bearing to rotatably support an armature shaft.

Figure 3:
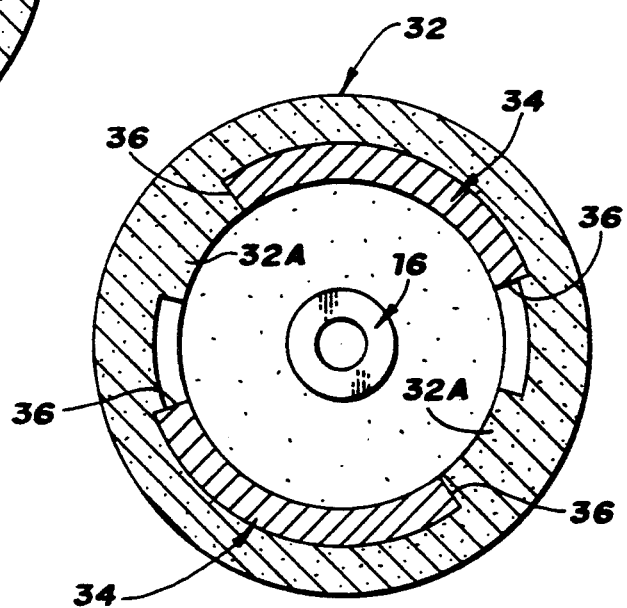
FIG. 3 is a sectional view of a modified frame and magnet assembly.

FIG. 3 illustrates a modified frame and magnet assembly that is adapted to be used as a component of an electric cranking motor of an electric starter. This embodiment differs from FIG. 2 in that the frame is shaped to provide auxiliary poles that modify the speed-torque characteristic of the motor to provide improved starting torque. In FIG. 3, the frame 32 corresponds to frame 12 and it is formed of the same material as frame 12. The permanent magnets 34 of FIG. 3 correspond to permanent magnets 14. The permanent magnets 34 are shorter in arcuate length than the magnets 14 of the FIG. 2 embodiment. Further, frame 32 has radially inwardly extending portions 32A, the arcuate inner faces of which are aligned with arcuate inner faces of magnets 34. Portions 32A form auxiliary or secondary poles that form a path for armature reaction flux developed by the armature of the motor in a manner well known to those skilled in the art. By using the auxiliary poles, the motor exhibits a series motor characteristic.

The magnets 34 are interlocked to frame 32 in the same manner as magnets 14 are interlocked to frame 12. Thus, the opposed ends of magnets 34 engage opposed arcuate surfaces (not illustrated) of frame 32 to prevent axial movement of the magnets 34 relative to the frame. Further, magnets 34 have surfaces 36 which engage surfaces of the frame 32 to prevent any radial movement of magnets 34 relative to frame 32 and prevent any circumferential movement of magnets 34 relative to frame 32.

As has been previously pointed out, frames 12 and 32 are formed of the same type of composite material which is molded to the magnets. This composite material will now be described.

The composite material for the frame is comprised of small size iron powder particles that are bound together by a thermoplastic material. By way of example and not by way of limitation, the iron powder particles may be a Hoeganaes 1000-C iron powder. The particle sizes of the iron powder particles may range from about 44 to 250 microns. However, a very small percentage of the powder may have a particle size as small as 10 microns. The powder is about 99.7% Fe, 0.003% C, 0.0005% N, 0.006% S and 0.004% P.

By way of example and not by way of limitation, the thermoplastic material that coats the iron powder particles may be an amorphous thermoplastic polythermide resin, an example of which is a General Electric "UL-TEM" (Registered trademark of General Electric) resin.

To prepare iron powder for molding, the particles are coated with a thin layer of the thermoplastic material. One way of accomplishing this is to mix the thermoplastic material with a solvent to provide a liquid material. The powder is then blown by air up through a vertical tube and at the same time the liquid material is sprayed on the powder to coat the powder particles. The coated powder falls outside of the tube and it is directed back into an inlet of the tube where it is blown up again and coated again. After a number of passes through the tube, the particles are all coated to the extent desired. The solvent evaporates or is recovered during this process.

Assuming now that iron powder particles have been coated in a manner that has been described, the coated particles can be molded to the permanent magnets and bearing bushing. Apparatus for injection molding the coated particles will now be described in connection with FIGS. 4 and 5.

Figure 4:
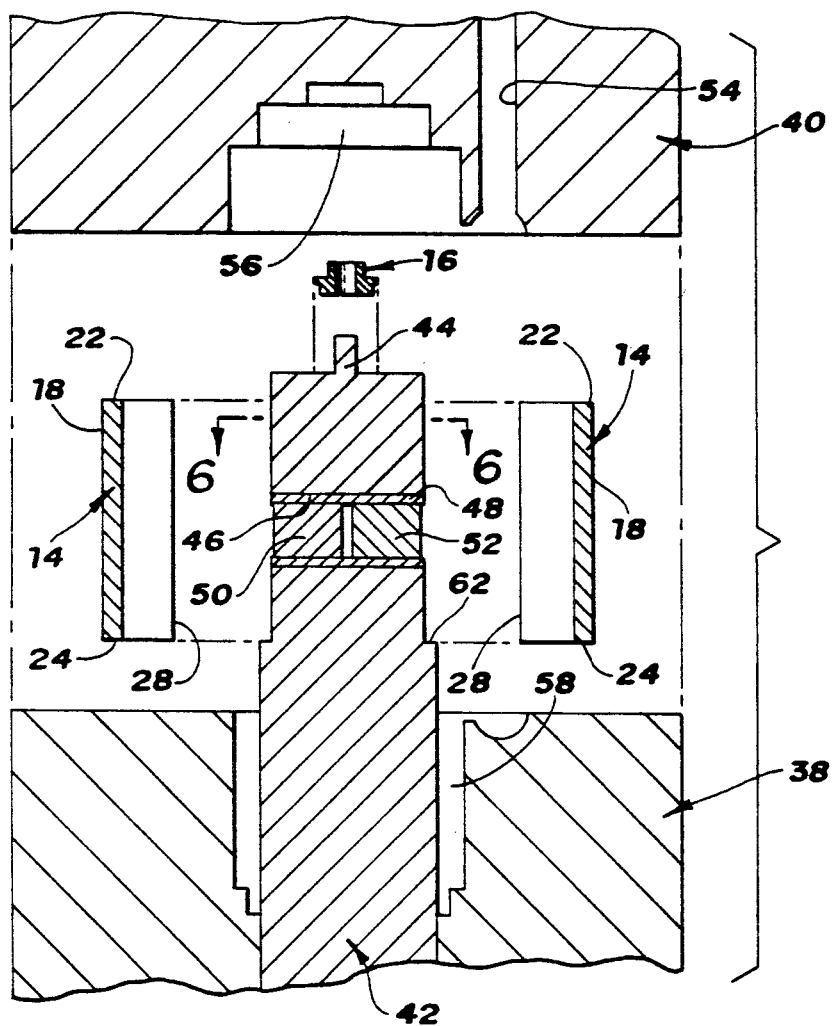
FIGS. 4 and 5 illustrate apparatus for injection molding composite iron powder and thermoplastic material to permanent magnets and to a bearing bushing.
Figure 5:
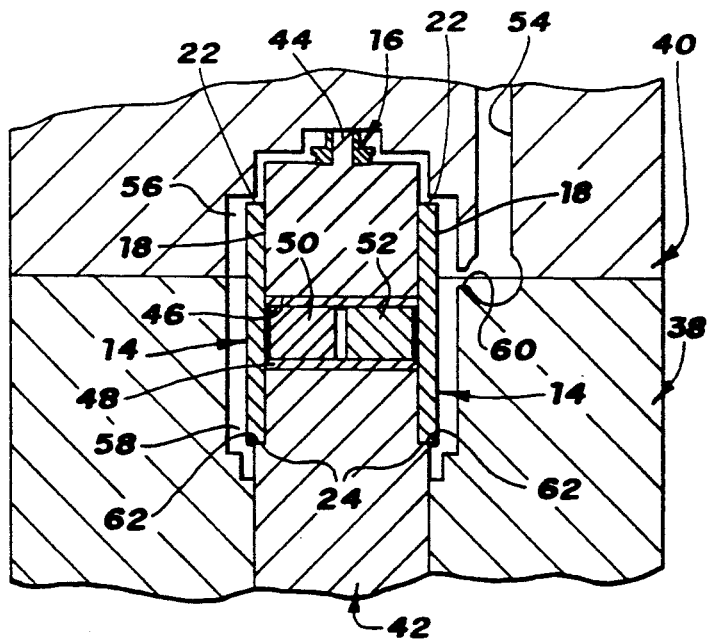

In FIGS. 4 and 5, injection molding apparatus is illustrated. FIG. 4 illustrates the molding apparatus in the open position and FIG. 5 in a closed position. The molding apparatus comprises a fixed mold part 38 and a movable mold part 40. Part 40 has axially extending rods or pins (not illustrated) that slide into axially extending bores (not illustrated) formed in mold part 38 when mold part 40 is moved from its open mold position (FIG. 4) to its closed mold position (FIG. 5). The molding apparatus further comprises a rod 42 that is movable relative to mold part 38. The lower end of rod 42 can be connected to a piston of a piston-cylinder apparatus for shifting the rod 42 relative to fixed mold part 38.

The upper end of rod 42 provides part of a mold cavity, as will be more fully described. This upper end has an axially extending portion 44 which is cylindrical and which is sized such that it fits into the central bore of bearing bushing 16.

The upper end of rod 42 has a bore 46 that extends radially through the rod. A brass tube or sleeve 48 is press fitted to bore 46 and it contains and supports two permanent magnets designated respectively as 50 and 52. The purpose of these permanent magnets is to form a holding means for securing the permanent magnets to the upper end of rod 42 or, in other words, holding the magnets in the proper position shown in FIG. 5 during injection molding of the composite material to the magnets 14.

The mold part 40 has a runner passage 54 and a mold cavity 56. Fixed mold part 38 has a cavity 58. When the mold is closed, as shown in FIG. 5, composite material is forced through runner 54 and into cavities 56 and 58 through a runner passage 60 that is formed by passage surfaces formed respectively in mold parts 38 and 40.

The operation of the molding apparatus shown in FIGS. 4 and 5 to form the frame and field assembly shown in FIGS. 1 and 2 will now be described.

Figure 6:
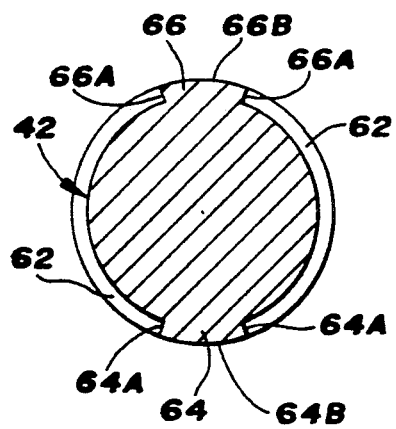
FIG. 6 is a sectional view taken along line 6—6 of FIG. 4.

With the mold open (FIG. 4), the bearing bushing 16 is assembled to portion 44 of rod 42. The permanent magnets 14 are now assembled to the upper end of rod 42. A small portion of the magnets 14 is magnetized which is sufficient to cause each magnet 14 to be attracted respectively by permanent magnets 50 and 52. The magnets 14 are assembled such that one end of the magnets each engage an arcuate radially extend in surfaces 62 on rod 42. As shown in FIG. 6, the upper end of rod 42 has a pair of opposed axially and radially extending portions 64 and 66. These portions have surfaces 64A and 66A that engage the surfaces 28 on magnets 14 to properly circumferentially position the magnets and to prevent the magnets from moving circumferentially during injection molding. These axially and radially extending portions have surfaces 64B and 66B that form surfaces 12A and 12B of frame 12 during injection molding.

When the magnets 14 and bearing 16 have been assembled to the upper end of rod 42, as shown in FIG. 5, the rod 42 is retracted to the FIG. 5 position and the mold is closed as shown in FIG. 5. The composite material is heated by an injection molding machine to a state where it can be supplied to the mold cavities. The material is forced into cavities 56 and 58 via runner 54 and runner passage 60. If necessary, the mold can be heated. After the cavities are filled and the mold is opened (FIG. 4) and the rod 42 is then projected to the FIG. 4 position. The molded part is then stripped from the upper end of rod 42.

The modified frame and magnet assembly shown in FIG. 3 can be made by the apparatus shown in FIGS. 4 and 5. The outer configuration of the upper end of rod 42 must be modified so that the molded frame part would include the auxiliary pole portions 32B.

The preferred proportions of thermoplastic material and iron powder that make up the composite material for the frame, by weight, is about 88 to 94% iron powder and 12 to 6% thermoplastic material.

In the final molded state of the frame, the cured thermoplastic material is bonded to the outer surfaces of the iron particles so that the particles are insulated from each other by thin layers of thermoplastic material. Further, the thermoplastic material bonds all the particles together to form a composite structure. It will be appreciated that since the particles are separated by thermoplastic material, there are gaps found between the particles. These gaps act like air gaps since the thermoplastic material separating the particles has about the same permeability as air. This air gap effect increases resistivity of the composite magnetic material and, consequently, reduces any eddy current losses.

After the composite material has been molded to the permanent magnets, the permanent magnets 14 are fully magnetized. They are radially magnetized such that face 18 has one magnetic polarity and the face opposite face 18 has an opposite magnetic polarity.

The composite frame can form the outer housing of a dynamoelectric machine or it can be arranged to be used with other parts that form the outer housing. Thus, the frame could be a sub-frame that is fitted to the interior of an outer frame in a manner disclosed in the U.S. Pat. No. to Martin et al., 4,071,788.

In the description of this invention, the frame and magnet assembly has two permanent magnets. It will be appreciated that more than two permanent magnets could be used. By way of example, six permanent magnets could be used that are arranged in a manner disclosed in the above-referenced U.S. Pat. No. to Merritt et al., 4,769,624.

The molding of the composite material to the permanent magnets has been described as being accomplished by injection molding. This could be accomplished by compression molding. When using compression molding, the thermoplastic coated iron powder particles would be placed in a heated mold. The material is heated and then subjected to pressure to compression mold the material to and around the permanent magnets and to and around the bearing bushing.

As has been pointed out, the composite frame material is a magnetic material and, accordingly, forms a flux path for flux developed by the permanent magnets. In the FIG. 3 embodiment, the frame also provides a flux path for armature reaction flux.

The embodiments of the invention in which an exclusive property or privilege is claimed are defined as follows:

1. A frame and permanent magnet assembly for a dynamoelectric machine comprising a frame formed of iron powder particles that are bound together by thermoplastic material and at least one permanent magnet carried by and secured to said frame, said permanent magnet having surfaces engaged by material of said frame, said surfaces and the frame material that engages said surfaces being so constructed and arranged as to provide an interlock between said frame and permanent magnet that prevents movement of said permanent magnet in axial and circumferential directions relative to said frame.

2. The frame and permanent magnet assembly according to claim 1 where said frame is molded to said permanent magnet.

3. The frame and permanent magnet assembly according to claim 1 where said frame has a tubular shape, and wherein said magnet engages an inner surface of said frame, said frame having a radially inwardly projecting portion located adjacent the permanent magnet that forms an auxiliary pole.

4. The frame and permanent magnet assembly according to claim 1 where the size of said iron powder particles is in a range of about 10 to 250 microns.

5. A frame and permanent magnet assembly for a dynamoelectric machine comprising, a frame formed of iron powder particles that are bound together by a thermoplastic material and at least one permanent magnet carried by and secured to said frame, said permanent magnet having first surfaces engaging material of said frame to prevent movement of said permanent magnet relative to said frame in a first direction, said permanent magnet having second surfaces engaged by material of said frame for preventing movement of said permanent magnet relative to said frame in a second direction that is substantially normal to said first direction, at least one of said first and second surfaces being so constructed and arranged that the frame material engaging it prevents movement of said permanent magnet relative to said frame in a direction away from said frame.

6. The frame and permanent magnet assembly according to claim 5 where said frame is molded to said permanent magnet.

7. The frame and permanent magnet assembly according to claim 5 where said frame has an end wall and wherein said end wall carries a bearing that is interlocked to said frame.

8. A frame and permanent magnet assembly for a dynamoelectric machine comprising, a tubular frame formed of iron powder particles that are bound together by a thermoplastic material, a plurality of circumferentially spaced permanent magnets carried by and secured to said frame, said permanent magnets located inside said frame, each of said permanent magnets having surfaces engaged by material of said frame, said surfaces and the frame material that engages said surfaces being so constructed and arranged to provide an interlock between said frame and permanent magnets that prevents movement of said permanent magnets in axial and circumferential directions relative to said frame.

9. A frame and permanent magnet assembly for a dynamoelectric machine comprising, a tubular frame formed of iron powder particles that are bound together by a thermoplastic material, an arcuately shaped permanent magnet extending axially of said frame, said permanent magnet being carried by and secured to said frame, said permanent magnet having opposed end surfaces engaging material of said frame to prevent movement of said permanent magnet relative to said frame in a direction axially of said frame, said permanent magnet having opposed side surfaces that extend radially and axially of said frame, said side surfaces engaging material of said frame to prevent movement of said permanent magnet relative to said frame in a direction circumferentially of said frame and in a direction away from said frame.

10. A frame and permanent magnet assembly for a dynamoelectric machine comprising, a tubular frame formed of iron powder particles that are bound together by a thermoplastic material, and a plurality of arcuately shaped permanent magnets located inside said frame and extending axially of said frame, each of said permanent magnets having surfaces engaged by material of said frame, said surfaces and the frame material that engages said surfaces being so constructed and arranged to provide an interlock between said frame and permanent magnets that prevents movement of said permanent magnets in axial and circumferential directions relative to said frame, said frame having a plurality of radially inwardly projecting portions located respectively adjacent respective ends of said permanent magnets, said projecting portions form in poles

* * * * *